United States Patent [19]

Meyer et al.

[11] Patent Number: 5,250,234
[45] Date of Patent: Oct. 5, 1993

[54] LIQUID DISTRIBUTOR APPARATUS AND METHOD FOR HIGH VISCOSITY LIQUIDS

[75] Inventors: Chris F. Meyer, Teaneck, N.J.; Chang-Li Hsieh, Carlisle; Ilya S. Michelson, Brookline, both of Mass.

[73] Assignee: Koch Engineering Company, Inc., Wichita, Kans.

[21] Appl. No.: 958,654

[22] Filed: Oct. 8, 1992

[51] Int. Cl.$^5$ ............................................. B01F 3/04
[52] U.S. Cl. ................................. 261/97; 261/112.2; 261/110
[58] Field of Search ..................... 261/97, 110, 112.2

[56] References Cited

U.S. PATENT DOCUMENTS

| | | | |
|---|---|---|---|
| 2,632,638 | 3/1953 | Turner | 261/97 |
| 2,978,998 | 4/1961 | Frankland | 261/110 |
| 3,006,623 | 10/1961 | Ross et al. | 261/97 |
| 3,114,786 | 12/1963 | Macrow et al. | 261/98 |
| 3,392,966 | 7/1968 | Eckert | 261/97 |
| 3,448,038 | 6/1969 | Pall et al. | 261/97 |
| 3,871,624 | 3/1975 | Huber et al. | |
| 3,918,688 | 11/1975 | Huber et al. | |
| 4,062,524 | 12/1977 | Brauner et al. | |
| 4,150,953 | 4/1979 | Woodmansee | 261/98 |
| 4,156,705 | 5/1979 | Ogawa et al. | 261/97 |
| 4,479,909 | 10/1984 | Streuber | 261/97 |
| 4,557,877 | 12/1985 | Hofstetter | 261/97 |
| 4,816,191 | 3/1989 | Berven et al. | |
| 4,855,089 | 8/1989 | Michels | 261/97 |
| 4,994,210 | 2/1991 | Lucero et al. | |

FOREIGN PATENT DOCUMENTS

| | | | |
|---|---|---|---|
| 1113680 | 9/1961 | Fed. Rep. of Germany | 261/97 |
| 1047502 | 10/1983 | U.S.S.R. | 261/97 |

OTHER PUBLICATIONS

Koch Engineering Company, Inc., "Static Mixing Technology", Bulletin KSM-6, 1991.

Primary Examiner—Tim Miles
Attorney, Agent, or Firm—Richard P. Crowley

[57] ABSTRACT

A liquid distributor apparatus and method for the distribution of a high viscosity liquid into a process vessel generally free of entrapped gas bubbles. The distributor apparatus includes a distributor for the high viscosity liquid with openings on the top of the distributor to vent gas entrapped in the high viscosity liquid. The distributor apparatus includes a feed pipe to deliver smoothly and without gas entrapment a high viscosity liquid from the distributor directly onto a cup-like or conical surface of a distributor tube to form a downwardly flowing film on the exterior surface of the distributor tube and to deliver the high viscosity liquid to the top section of the process vessel without gas entrapment. The method comprises venting gas from a high viscosity liquid and slowing the downward velocity of the vented, high viscosity liquid into the process vessel to avoid further gas entrapment.

29 Claims, 3 Drawing Sheets

LIQUID DISTRIBUTOR APPARATUS AND METHOD FOR HIGH VISCOSITY LIQUIDS

BACKGROUND OF THE INVENTION

Fluid contact columns and chemical reactors, and particularly gas-liquid contact columns, liquid-liquid or liquid-chemical reactors, are employed in a wide variety of processes to include, but not be limited to: adsorption, stripping, devolatilization scrubbing, distillation, extraction and chemical-type processes such as reactions. The fluid contact devices generally contain a main or predistributor and a plurality of lower level distributors designed to receive a liquid to be introduced into the upper section of the column and to be distributed more or less uniformly over substantially the entire cross sectional area of the column or reactor. In gas-liquid contact columns, the liquid is distributed generally with an upwardly flowing gas in the column, with the liquid removed from the lower portion of the column after contacting with the gas, and the gas removed from the top portion of the column. In chemical reactors, the liquid may be introduced in the top of the column for any type of chemical reaction or process and flow through the mass transfer devices, and more particularly, through structured packing acting as a static mixing device to ensure plug flow of the liquid downwardly through the column, and with the liquid then removed from the bottom portion of the column. Columns and reactors may contain for example a plurality of contacting zones, and such zones may comprise generally packing-type material, either random or structured-type packing, or combinations thereof, positioned to effect the efficient contact between the upwardly flowing gas and the downwardly flowing liquid or for the mixing of the downwardly flowing liquid to provide for a substantial plug flow of the liquid downwardly.

In particular, the liquid distributor apparatus generally employs a central parting box or tubular manifold as a predistributor for the liquid, which generally extends perpendicularly to a plurality of parallel arranged liquid distributor troughs or pipes. The liquid is fed in from a pipe or source into the predistributor, and from the predistributor, the liquid is fed to the plurality of liquid distributors for distribution through downwardly flowing holes in the distributor onto the top section or some zones of the reactor or column. Typically, distributors employed in contact columns are described for example in U.S. Pat. No. 4,062,524, issued Dec. 13, 1977, U.S. Pat. No. 4,816,191, issued Mar. 28, 1989 and U.S. Pat. No. 4,994,210, issued Feb. 19, 1991.

The type of packing employed in columns and reactors is typically structured packing composed of corrugated lamellas or intersecting bars and blades wherein mixing takes place within the packing elements as the liquid or liquid-gas is continually subdivided. Generally, the corrugations of adjacent lamellas, or open flow channels formed by intersecting bars or blades, are oriented in different directions, while adjacent packing element layers are angularly offset from each other. Further describing corrugated lamellas, each lamella has corrugations therein with the corrugations of sequentially arranged lamellas being oriented in different directions and with the corrugations with at least one or two sequentially arranged lamellas relative to the direction of flow being disposed at an angle at said longitudinal axis and each packing element generally angularly offset to an adjacent packing element at not more than about 90°. The mixing lamella employed typically is also perforated and for example, may be composed where each lamella is made of a metal woven screen material.

Another type of structured packing comprises packing or static mixer elements having a plurality of intersecting stationary bars or blades, for example, placed lengthwise within a pipe with adjacent bar or blade elements usually positioned 90° relative to each other. Such structured packing is designed to provide radial mixing and plug flow, particularly for use in chemical reactions to perform continuous chemical reactions. Plug flow of the product is desirable so that all the product passes through the reactor within a defined time period. Radial mixing is desirable to provide uniformity in flow of the product. One type of structured packing designed for high viscosity, tubular plug flow reactors is SMX TM packing, while SMV TM packing, which includes separation plates between layers to prevent large scale recirculation and back mixing, is useful for gas-liquid applications for low and moderate viscosity liquids. (SMX and SMV are trademarks of Koch Engineering Company, Inc. of Wichita, Kans.). Three plug flow-type structured packings are described for example in U.S. Pat. Nos. 3,871,624, 3,918,668 and 4,062,524.

Performance of fluid contact columns and chemical reactors is generally improved by proper distribution of the liquid feed. Particular problems arise in connection with the distribution and flow of high viscosity liquids in gas-liquid contact columns or in chemical reactors and in other downward liquid flow mixing vessels. It is therefore desirable to provide for an efficient, effective distributor apparatus and method for high viscosity liquids in fluid contact columns and chemical reactors.

SUMMARY OF THE INVENTION

The invention relates to a liquid distributor apparatus and method particularly directed to the distribution of high viscous liquids in a process vessel, such as gas-liquid contact column, reactor or devolatilization vessel.

In order to provide for the uniform and efficient distribution of a liquid at the top of a process vessel, liquid distributors generally depend upon the liquid feed pressure or gravity to feed the liquid downwardly through the openings located on the bottom or side of the distributor. Generally, such liquids are low viscosity liquids and emanate from the sides or bottom or both of pipes or troughs extending across the top of the process vessel. The liquid is distributed substantially uniformly across the top of random or structured packing material. Generally, no provision is made to slow down the liquid velocity after leaving the liquid distributor on its downwardly flowing path.

Conventional liquid distributors exhibit performance deficiencies when utilized to distribute high viscosity liquids in processing vessels such as gas-liquid contact columns, chemical reactors, devolatilization vessels or the like. Where a high viscosity liquid is introduced into the header box or tubular manifold of a liquid distributor apparatus for distribution to liquid distributors, it has been found that vapor pockets, especially non-condensable gas pockets, are entrapped within the high viscosity liquid. The entrapped vapor and gas pockets cause flow restriction and result in a non-uniform liquid distribution of the high viscosity liquid through conventional liquid distributors. Further, it has been found that if the velocity of the high viscosity liquid streams leaving the holes of the conventional liquid distributor apparatus is not properly dampened in its downward flow, additional gas, that is, for example, air bubbles, can be entrapped as the liquid stream flows downwardly and reaches the vessel internals and/or the level of the liquid pool in the top portion of the vessel. These entrained bubbles can be the source of a wide variety of unfavorable processes performances. It is therefore desirable to provide for a new and unique distributor apparatus and method and design for high viscosity liquid applications which overcome some of the deficiencies related to high viscosity liquid flow.

An additional deficiency of conventional distributors and methods is that no provision is provided for devolatilization of entrained gases in the feed liquid, such as gas entrained in an upstream process, e.g. equipment, and dispersed to relatively small drop size.

It has been found that most of the problems associated with viscous liquid distribution may be mitigated or solved by employing header boxes or tubular manifolds in the liquid distribution apparatus which have one or more holes or openings or a plurality thereof located in the top of the distributor. As a result, entrapped air or gas pockets within the high viscosity liquid in the header box can be vented. The header box or distributor will then be completely filled with a liquid having little, if any, accumulated gas bubbles. In addition, the liquid streams in the liquid distributors are then redirected downwardly over surfaces to receive directly without liquid splashing the downwardly flowing stream and are designed to slow down the velocity of the liquid streams, such as by increasing the surface area of downward flow, and to introduce the liquid streams directly into the top of the mass transfer devices or into a liquid pool in the top section of the processing vessel, thereby avoiding the subsequent reentrainment of air or gas in the downwardly flowing liquid stream after it leaves the distribution trough or pipes. Devolatilization of entrapped gas in the liquid feed stream and not removed by venting or gas entrapped within the process vessel can be accomplished during the low velocity, downward film flow of the high viscosity liquid over the extended surface area into the top of the packing or liquid pool of the process vessel. Devolatilization and removal of air bubbles may also be enhanced by the application of a vacuum to the top of the process vessel. The degree of devolatilization varies with and is dependent upon the liquid viscosity, dispersed drop size, film thickness, film velocity, temperature, pressure and other parameters.

Thus, the invention is directed to a liquid distributor apparatus and method where the liquid outlet holes or openings are located at the top of the distributor tubes in a liquid distributor apparatus so that the air or gas pockets entrapped within the liquid which is inside the tubes can be vented to prevent non-uniform downward flow, so that the high viscosity liquid stream leaving from the top of the boxes or tubes can be redirected downwardly by means of tubes or plates, expansion cylinders or other means which receive the vapor-free high viscosity liquid. Velocity reduction means are used to receive directly the downwardly flowing high viscosity liquid to reduce the velocity and to introduce vapor free the downwardly flowing liquid, without splashing, directly on to the top of the mass transfer devices or column or directly to a pool of liquid on the top surface of the process vessel. As a result of reduction of velocity of the high viscosity liquid, typically by increasing the surface area of the downward flow in film form of the liquid, the liquid stream will not substantially entrain any substantial air or gas bubbles as the stream reaches its final contact location, and the liquid is devolatilized during its downward flow.

The invention concerns a liquid distributor apparatus for process vessels, such as a gas-liquid contact column, devolatilization vessel or a reaction vessel, to distribute a high viscosity liquid generally free of entrapped gas, such as air bubbles, in high viscosity liquids and generally uniformly across substantially the cross sectional area of the top of the process vessel which apparatus comprises a liquid distributor means for the distribution of a high viscosity liquid and having openings or other openings to permit the venting of the gas or air within the high viscosity liquid and which accumulates in the upper portion of the liquid distributor means to permit the generally uniform flow of the high viscosity liquid stream from the top openings.

The liquid distributor apparatus also includes a velocity reduction means to receive directly, without splashing, the high viscosity downwardly flowing liquid stream issuing from the liquid distributor means and to permit devolatilization and to prevent the further entrainment of air or gas bubbles in the downwardly flowing liquid film during its downward flowing course until the high viscosity liquid reaches the final mass transfer contact location, either the surface of a liquid pool at the top of a chemical reactor or process vessel or the face of the vessel internals, such as the gas-liquid contact column. The velocity reduction means provides for the continuous flow of the high viscosity liquid streams from the openings in the liquid distributor means to the final contact location in the process vessel.

The invention includes a method of distributing generally uniformly and across the entire cross section area of the top of a process vessel a high viscosity liquid, such as a liquid having a viscosity greater than about 500 cps, such as 5,000 cps or more, which method comprises venting the viscous liquid within a liquid distributor header, such as through openings in the top or liquid header to remove entrapped gas, such as air, and thereafter reducing the velocity of the downwardly flowing, vented high viscosity liquid to prevent the reentrainment of gas or air within the downwardly flowing liquid and moving the downwardly flowing liquid in a continuous, non-splashing stream or streams until the liquid reaches its fluid contact location within the process vessel. The method includes directing the high viscosity liquid from the top of the liquid distributor or header, redirecting the vented liquid downwardly to the resurface of strategically placed cylindrical tubes or plates to provide a liquid film on the surface of the plates or tubes to slow the liquid velocity so that as the result of the velocity reduction of the high viscosity liquid stream flowing over the surfaces in a continuous film from the viscous liquid stream does not entrain significantly any further gas or air bubbles. The tubes and plates generally are so positioned and extend to or onto a surface of a liquid pool on the top of the process vessel or into a structured packing or at least to the top surface of the vessel internals thereby preventing the further entrapment of gas in the high viscosity liquid.

The liquid distributor apparatus and method of the invention are directed particularly to high viscosity liquids; however, the nature, manner and form of the liquid stream may vary as well as the viscosity. The liquid may have a viscosity as low as 500 cps at 25° C. or more where SMV TM packing is used in a gas-liquid application, and particularly greater than 10,000 cps and particularly effective in viscosity liquid streams greater than 5,000 cps to 20,000 cps or more where SMX TM packing is used in reactors and devolatilization applications. In one embodiment, the liquid distributor and apparatus of the invention are directed to a process vessel which contains a plurality of layers of structured, laminated packing elements or bar or blade static mixing elements which are designed to provide for essential plug flow of a high viscosity liquid introduced into the top of the column so as to provide for the liquid to flow slowly through the column in a defined time period and to permit the liquid to react internally within itself for a defined time period, for example, to a defined level of polymerization.

In one embodiment, the liquid is generally pumped under pressure to the top of the vessel as a high viscosity liquid, vented and than introduced directly into a liquid pool at the top of the vessel, which liquid pool is then downwardly flowed into structured, blade or bar packing or corrugated lamellas which are the mixing apparatus as described supra with the resulting liquid at the bottom or the process vessel either removed or pumped to one or more process vessels to continue the process or even to a different process until the desired reaction or process is completed. For example, in this embodiment, the liquid distribution apparatus and method can be employed with a high viscosity reaction liquid from a reaction vessel, such as a long chain, high molecular weight molecule or solution or such in a solvent, which further reacts within itself or with other components alone or in the presence of a catalyst to provide a desired high viscosity, high molecular weight product. For example, high viscosity reaction liquids are often pumped into holding tanks, or series of holding tanks, with or without agitation, and maintained for a period of time, minutes or hours, to permit the reaction to occur, and then the high viscosity product is removed. The employment of one or a plurality of serially linked columns employing the liquid distributor apparatus and method with the use of a high viscosity reacting liquid thus permits the conversion of a batch or semicontinuous batch process directly into a continuous tubular, plug flow reactor process.

In another embodiment of the invention, the liquid distributor apparatus and method may be efficiently employed in a gas-liquid contact column wherein a high viscosity liquid is introduced into the top of the column and a gas or vapor stream passes upwardly through the random or structured packing of the column, and the treated liquid then removed from the bottom of the column and the gas or vapor removed from the top of the column to be used, recycled or vented. Such gas-liquid contact columns and the treatment of liquids with upwardly flowing gas streams wherein one column or a plurality or serially connected columns are well known and would include, but not be limited to the chemical reaction or treatment of high viscosity liquid with an upwardly flowing reactive gas for example where a gas is required to be scrubbed or reacted by one or more ingredients of the downwardly flowing liquid stream with the upwardly flowing gas or vice versa. Thus, the high viscosity liquids may include high viscosity monomeric, or partially polymerized, products, or solutions of such in solvent, which result in long chain, high molecular weight polymer products and may include high viscosity natural liquids, such as molasses, sugar products, as well as viscous glycol product, such as glycerine and other products alone or in liquid combinations.

Thus, the method permits the processing of viscous, long chain, high molecular weight molecules in a feed liquid or solution of such molecules in solvent for a homogeneous liquid phase reaction. The liquid distributor and method are useful in reactors for the polymerization of partially polymerized product, for example, second stage reactor or hydrolysis reactor or with reactors for the enzymatic attack of a high molecular weight product that is the hydrolysis or breakdown of a viscous feed liquid.

The liquid velocity reducing means used may vary and typically may provide any type of surfaces onto which the vented liquid from the liquid feeder box passes continuously in its downwardly flowing path at a low velocity, so as not to entrap gas or air therein and would include for example a plurality of spaced apart plates extending from the liquid distributor tubes or cylindrical tubes for example having a conical face surface at one end which is placed directly beneath the tubes extending from the top of the liquid distributor tubes with the downwardly flowing liquid as directed onto a generally conical surface without falling any distance and which forms a thin, downwardly flowing film over the cylindrical surface until the downwardly flowing film reaches the top of the process vessel internal or the pool of liquid at the top of the process vessel. Also, in addition to the use of a conical surface for velocity reduction, an inverted surface or a cup-like container and surface may be used to reduce velocity and to form a film of the downwardly flowing liquid over a cylindrical surface.

The velocity reducing means of the invention provides for an increase in the flow surface area of the vented high viscosity liquid received from the top of the liquid distributor means so that the increased surface area leads to a decrease in velocity as the downwardly flowing liquid spreads out over a greater surface area and moves downwardly in a gentle and smooth flow film directly from the top of the liquid distributor means until the high viscosity liquid reaches the contact area of the process vessel. The increase in downward flow surface area may be accomplished using plates or tubes or other means generally positioned directly beneath the feed pipe from which high viscosity liquid is received from the liquid distributor means. Such feed pipe is not blocked as the one end so as to permit venting as the high viscosity liquid emerges from the one end of the feeding means. For example, the high viscosity liquid may flow downwardly from the end of a feed pipe onto a conical surface of a tube to the exterior surface of the tube means which provides for an increased, downwardly flow surface area, for amy flow to a cup-like arrangement at the one end of the tube means and overflow the cup to flow downwardly over the exterior surface. Where the high viscosity liquid flow is great, it is often desirable to provide for a self-draining, cylindrical splash guard means about the one end of the tube means to contain the high viscosity liquids so that at high flow rates, the high viscosity liquid at the one end of the tube means may overflow the cylindrical guard means and then flow over the exterior surface of the cylindrical guard means and hence, onto the surface of the tube means below to the final process area.

The invention will be described for the purposes of illustration only in connection with certain embodiments; however, it is recognized that various changes, modifications, improvements and additions maybe made to the illustrated embodiments of the invention by a person skilled in the art without departing from the spirit and scope of the invention.

DESCRIPTION OF THE EMBODIMENTS

Figure 1:
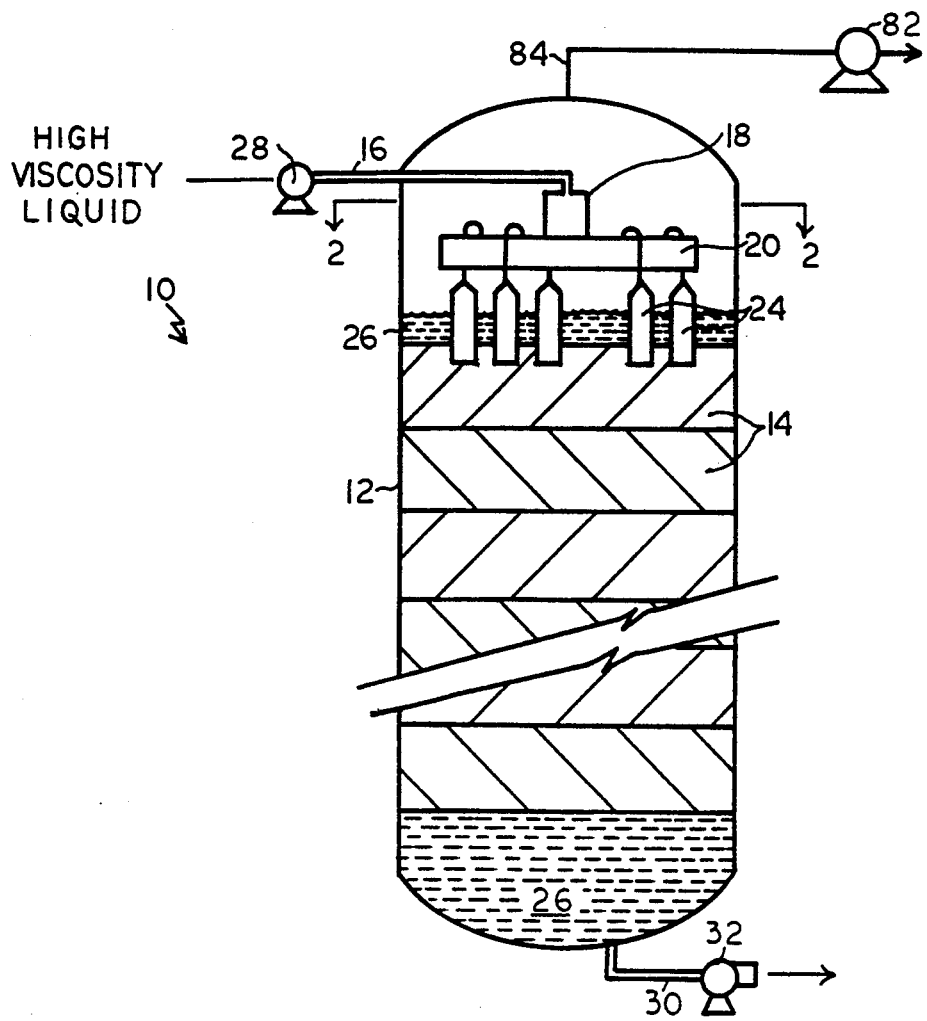
FIG. 1 is a schematic, sectional illustration of a process vessel showing the liquid distributor apparatus and system of the invention in a liquid-chemical reactor.
Figure 2:
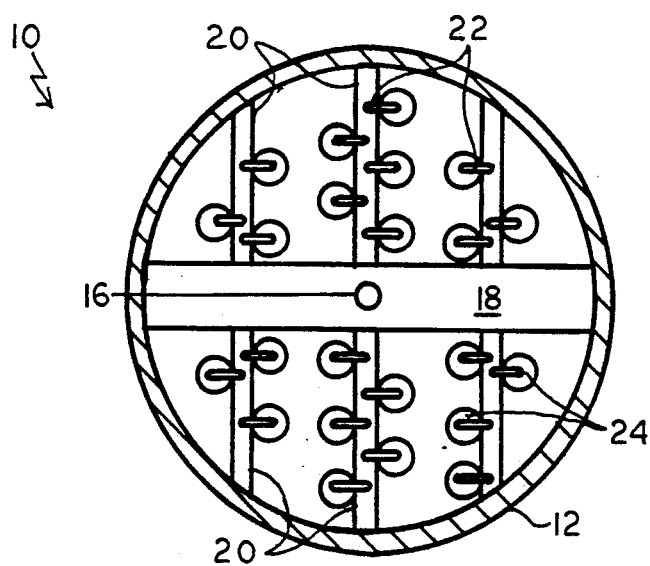
FIG. 2 is a cross sectional view along lines 2—2 of FIG. 1.

With particular reference to FIGS. 1 and 2, there is shown a process system and vessel 10 comprising a process vessel 12 containing alternate layers of structured laminated packing 14. The vessel 12 has an inlet 16, a pump 28 for the introduction of a high viscosity liquid feed into inlet 16 and to the parting box or tubular manifold 18 extending across the top of the column which is a predistributor box, which feeds a plurality of generally uniform, spaced apart distributor tubes 20 from the parting box 18 The bottom of the reactor vessel 12 has an outlet 30 and a pump 32 for pumping the high viscosity liquid product from the outlet after passage through the reactor vessel 12. The process vessel as illustrated is directed to the processing of a high viscosity, high molecular weight, polymeric liquids, or solutions of such in solvent, having a viscosity of about 5,000 cps to 20,000 cps, and which high viscosity liquid travels through the reactor vessel 12 in a defined time period to permit the polymeric liquid to react. Optimally, the process vessel 10 may include a vacuum line 84 and a vacuum pump to aid in the devolatilization of the downwardly flowing liquid 26. Although only one process reactor 12 is shown, the high viscosity liquid passing through the reactor 12 may then be pumped into one additional or further reactor vessels 12 as required to provide for the desired time period and reaction. In the process reactor 12 as illustrated, high viscosity liquid 26 accumulates at or slightly above the top layer 14 of the structured packing material to form a liquid pool. A plurality of feed tubes 22 are directed from top holes in the distributor tubes 20 in the distributor legs 24 (see FIG. 3).

Figure 3:
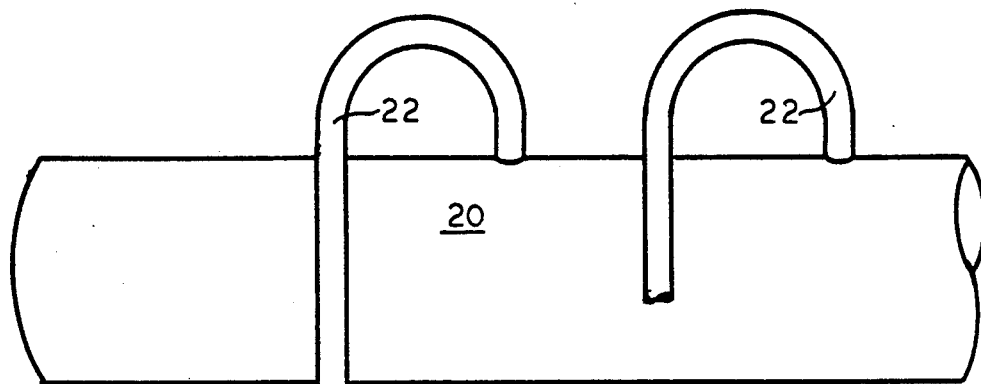
FIG. 3 is an enlarged, fragmentary, partial sectional view of the liquid distributor illustrated in FIGS. 1 and 2.

With reference to FIG. 3, there is shown a distributor tube 20 and a feed tube 22 having another end extending downwardly into a distributor leg 24. As illustrated, the bottom surface of the distributor leg 24 extends to the top surface of the laminated structured layer 14 and into liquid pool 26. The distributor leg 24 includes a tube 34 having a one and the other end, the one lower end 36 sealed, and the upper end has a conical shaped surface 40 which upper end of the tube 34 is surrounded by a cylindrical splash guard 38, which extends about the upper end of the tube 34 and is spaced slightly apart thereof to form an adequate gap to provide downward drainage for the high viscosity liquid. The distributor leg 24 includes three metal support fins 42 of about 120° separation having an open surface therein 48 with the splash guard 38 welded to the metal fins 42, and with the apex of the conical surface at the one end of the tube 34 extending slightly into the opening of the other end of the feed tube 22 which permits gases entrapped in the liquid distributor pipe 20 to be vented from the other end of the feed tube 22. The feed tube 22 is positioned to permit the high viscosity liquid 26 to flow from the other end of feed tube 22 directly onto the conical surface through tube opening 44 to form a liquid film which flows over the conical surface 40 through the small gap 46 downwardly along the exterior surface of the tube 34 directly into the pool 26.

During periods of high flow rates of the high viscosity liquid 26, the space between the splash guard 38 and the conical surface 40 of the tube 34 fills up and the high viscosity liquid may then overflow and form a film to drain down the outside of the tube 34 as film 52. As illustrated in FIG. 3, the high viscosity liquid 26 being distributed in pipe 20 flows through feed pipe 22 and any entrapped gases are vented at the outlet of the feed pipe 22 from vent 44 and the high viscosity liquid is permitted to flow without splashing onto the conical surface 40 of the tube 34 and downwardly to form a film 50 which flows directly into the liquid pool 26. At overflowing, it forms a downwardly flowing film 52 on the outside of the splash guard 38 which may join the film 50 in flowing directly into the liquid pool. In this arrangement, there is no dropping or splashing of the liquid through any space so that there is no entrainment of any air or gas in the liquid. The liquid flows gently, smoothly and continuously without interruption over a greater surface area than the exits of tube 22 into the pool 26.

Figure 4:
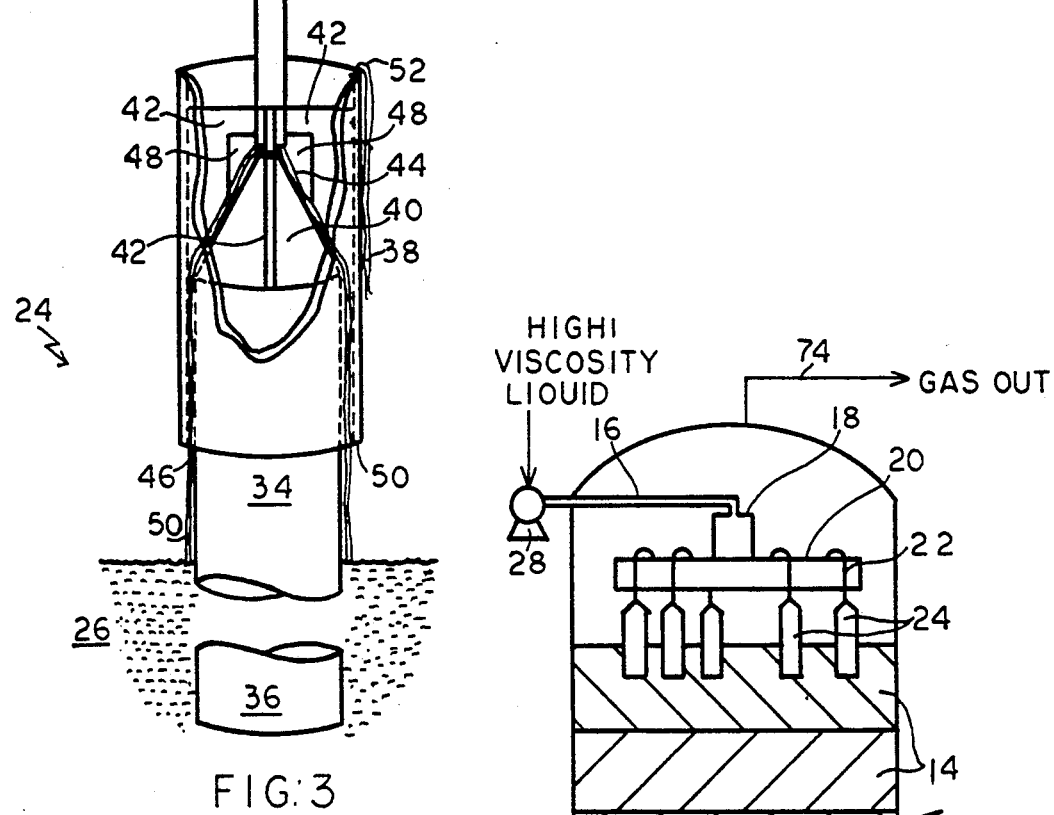
FIG. 4 is a schematic, sectional illustration of the liquid distributor apparatus of the invention and system in a gas-liquid contact column.

With reference to FIG. 4, there is shown a gas-liquid contact column 70, an inlet 16 and a pump 28 to introduce a high viscosity liquid into the top surface through a parting box or tubular manifold 18 into a distributor tube 20 containing feed tube legs 22 and a plurality of distributor legs 24. The column has a plurality of layers of laminated structured packing 14 and has an outlet 30 for withdrawal through pump 32 of the liquid 26. However, in process 70, a gas is introduced through 72 in the lower portion of the reactor and permitted to flow upwardly through the structured packing 14 to form a gas-liquid contact as the high viscosity liquid flows uniformly down the reactor vessel with the gas removed through outlet 74. In this process, there is no pool of liquid at the top surface of the laminated structure 14. However, the distributor's length extends somewhat on top of or slightly into the top structured packing layer 18, so that the high viscosity liquid may be delivered directly into the structured packing layer without entrapping any further gas.

Figure 5:
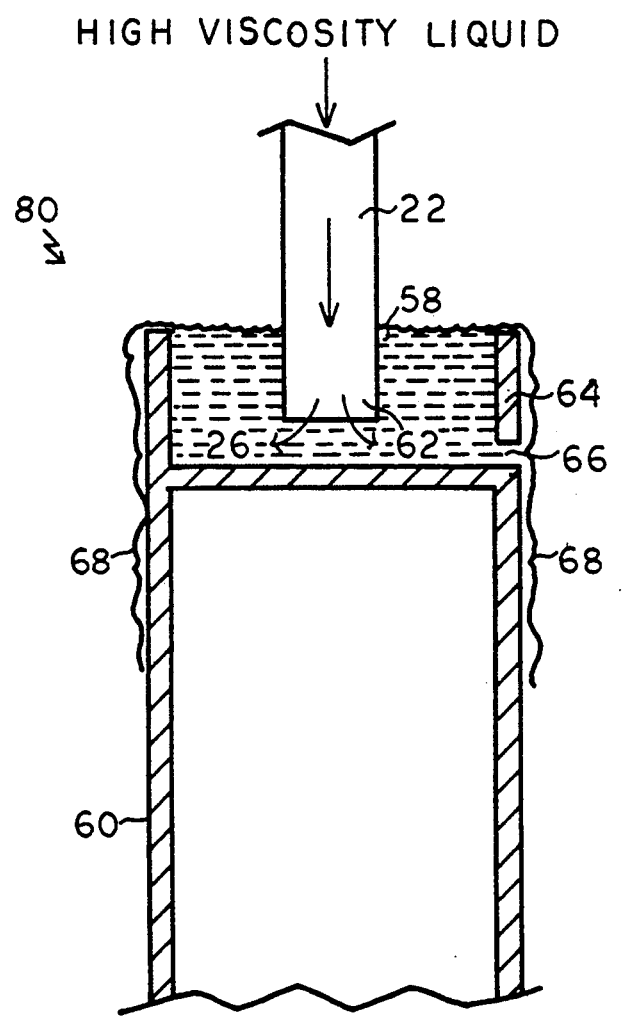
FIG. 5 is an enlarged, fragmentary, partial sectional view of another type of velocity reduction distribution leg useful in the liquid distributor of the invention.

FIG. 5 shows another embodiment of a distributor leg 80 comprising a closed end cylinder 60 with an open cup-like top 64 to receive a high viscosity liquid 26 from the tube 22 and form a pool of the liquid 26 within the interior of the cup top 64. The cup top 64 includes a drainage hole 66 (or a plurality of holes can be used) to permit the high viscosity liquid 26 to flow out of the drainage hole 66 and form a thin, slow velocity flow film 68 of liquid 26 over the exterior surface of the cylinder 60. At low flow rates, the liquid 26 flows into cup 64 and then out of the drainage hole 66; however, at higher flow rates, the liquid 26 may overflow the cup top 64 and form a downwardly flowing film 68 on the exterior surface of the cylinder 60. The top of the cup rim may be smooth or as illustrated may be serrated which permits the liquid 26 to flow more smoothly into the film 68. This illustrated cup distributor leg captures the liquid 26 within the cup to 64 after discharge from the tube 22 and slows the velocity of downwardly flow by increasing the surface area of the flow and avoids the entrapment of gases in the high viscosity, slow, downwardly flowing liquid. If desired, a splash guard maybe used about the cup top 64, and the portion of the tube 22 within the cup top 64 supported and secured by support fins or other means as illustrated in FIGS. 1-3.

The liquid distributor apparatus and method as illustrated provides for the processing of a high viscosity liquid and removes entrained gases in the distributor and prevents the reentrainment of gases as the high viscosity liquid is introduced into the contact area of the process vessel.

What is claimed is:

1. A distributor apparatus to distribute a high viscosity liquid generally free of entrapped gas bubbles and generally uniformly across the substantial cross section area of a process vessel containing packing material, which apparatus comprises:
    a) a liquid distributor means to receive and distribute a high viscosity liquid, the liquid distributor means having a plurality of openings on the top portion to permit the venting of gases from within the high viscosity liquid from the liquid distributor;
    b) feed pipe means to permit the downward flow of the vented high viscosity liquids from the plurality of openings; and
    c) flow velocity reduction means comprising a tube means having a one and other end and an exterior surface, the tube means positioned to receive directly the vented high viscosity, downwardly flowing liquid from the liquid distributor means and to form a downwardly flowing, generally continuous film of the vented high viscosity liquid on the exterior surface of the tube means to reduce the liquid velocity and to prevent the further entrainment of gas bubbles in the downwardly flowing, high viscosity liquid until the high viscosity liquid reaches a liquid contact location in the process vessel.

2. The apparatus of claim 1 wherein the liquid distributor means comprises a plurality of generally parallel, spaced apart distributor tubes extending across the top cross sectional area of the vessel.

3. The apparatus of claim 1 which includes a self-draining splash guard means positioned about the tube means at the one end to prevent outward splashing of the high viscosity liquid from the one end of the feed pipe means and to contain excess flow of the high viscosity liquid, the splash guard means positioned slightly apart from the exterior surface of the tube means.

4. The apparatus of claim 1 which includes a plurality of metal support fins extending generally outwardly and radially from the axis of the tube means, the fins extending from the feed pipe means to the splash guard means to retain the tube means in position.

5. The apparatus of claim 1 which includes splash guard means positioned about the periphery of the tube means at the one end to prevent outward splashing of the high viscosity liquid and spaced slightly apart from the exterior surface of the tube means, so as to permit the high viscosity liquid to flow downwardly over the exterior surface of the tube means and during high flow rate of the high viscosity liquid to flow over the top of the splash guard means and flow downwardly over the exterior surface of the splash guard means.

6. The apparatus of claim 1 wherein the packing material comprises a plurality of layers of structured corrugated packing material or a structure of intersecting bars or blades.

7. The apparatus of claim 1 wherein the packing comprises structured packing comprising intersecting bars or blades to promote plug flow of the liquid in the process vessel.

8. A devolatilization vessel for the devolatilization of a gas in a high viscosity liquid which vessel contains therein a plurality of packing elements, an inlet means for the introduction of a high viscosity liquid containing entrapped gas, an outlet means to withdraw the devolatilized liquid, and the distributor of claim 1 to distribute the high viscosity liquid onto the top surface of the packing elements.

9. A process vessel to receive and treat a high viscosity liquid which process vessel contains therein a plurality of packing elements and an inlet means to introduce a high viscosity liquid into the uppermost portion of the process vessel and an outlet means to remove high viscosity liquid product from a lower portion of the process vessel and a liquid distributor apparatus of claim 1 within on the top section of the process vessel to distribute the high viscosity liquid generally uniformly over the top surface of the packing material, the high viscosity liquid forming a liquid contact location on the top surface of the packing material and the flow velocity reducing means extending into the liquid contact location.

10. A gas-liquid contact column which comprises a plurality of packing elements, an inlet means to introduce a high viscosity liquid into the uppermost portion of the column, an outlet means to remove gas-contacted high viscosity liquid from the lower portion of the column, a gas inlet to introduce an upwardly flowing gas stream into the column to contact the downwardly flowing, high viscosity liquid, a gas outlet in the upper portion of the column to remove an upwardly flowing gas stream and a liquid distributor apparatus of claim 1 to distribute the high viscosity liquid generally downwardly across the upper cross sectional area of the packing material.

11. The apparatus of claim 1 wherein the velocity reducing means comprises:
    a tube means having a one and an other end and characterized by a cup-like enclosure means at the one end and having an exterior surface, the cup-like enclosure means positioned to receive the high viscosity liquid from the other end of the feed pipe means and to permit the high viscosity liquid to flow downwardly from the cup-like enclosure as a film over the exterior surface of the tube means to the contact area within the process vessel.

12. The apparatus of claim 11 wherein the cup-like enclosure means includes a drainage means to permit the downward flow of high viscosity liquid from the interior of the cup-like enclosure means.

13. The apparatus of claim 1 wherein the means to permit downward flow of the high viscosity liquid comprises generally U-shaped feed pipe means having a one end secured to the said openings and the other end adjacent the flow velocity reducing means.

14. The apparatus of claim 13 wherein the velocity reducing means comprises:
a tube means having a one and the other end and characterized by a cone at the one end having an apex and a conical surface and an exterior tube surface, the apex of the cone positioned to receive the high viscosity liquid from the other end of the feed pipe means and to permit the high viscosity liquid to flow downwardly, as a film, over the conical surface and the exterior surface of the tube to the contact area within the process vessel.

15. The apparatus of claim 14 wherein the apex of the cone is positioned centrally and generally beneath the other end of the feed pipe means to receive directly the high viscosity liquid from the one end of the feed tube means and to permit venting of the entrapped gases from the other end of the feed pipe means.

16. The apparatus of claim 15 wherein the other end of the tube means is sealed and extends to the surface of a liquid contact location in the process vessel.

17. A distributor apparatus to distribute a high viscosity liquid generally free of entrapped gas bubbles and generally uniformly across the substantial cross section are of a process vessel containing packing material, which apparatus comprises:
a) a liquid distributor means to receive and distribute a high viscosity liquid, the liquid distributor means having a plurality of openings on the top portion to permit the venting of gases from within the high viscosity liquid from the liquid distributor;
b) feed pipe means to permit the downward flow of the vented high viscosity liquids from the plurality of openings which means comprises a generally U-shaped fed pipe means having a one end secured to the said openings and the other end adjacent a flow velocity reducing means; and
c) flow velocity reduction means comprising an exterior surface positioned to receive directly the vented high viscosity, downwardly flowing liquid from the liquid distributor means and to form a downwardly flowing, generally continuous film of the vented high viscosity liquid on the exterior surface to reduce the liquid velocity and to prevent the further entrainment of gas bubbles in the downwardly flowing, high viscosity liquid until the high viscosity liquid reaches a liquid contact location in the process vessel.

18. A method of uniformly distributing a high viscosity liquid through a process vessel containing mass transfer devices therein, which method comprises:
a) introducing a high viscosity liquid into the uppermost portion of a process vessel and into a liquid distributor means to distribute the high viscosity liquid substantially uniformly across the upper surface of the process vessel;
b) venting trapped gases within the high viscosity liquid from the upper surface of the liquid distributor means to remove entrapped gas;
c) directing downwardly by feed pipes the vented high viscosity liquid;
d) flowing the vented high viscosity liquid from the feed pipes directly and continuously as a film over a large tubular exterior surface area to slow the flow velocity of the high viscosity liquid, as it flow downwardly in the process vessel to prevent the further entrapment of gas in the downwardly flowing high viscosity liquid; and
e) introducing the vented, downwardly flowing high viscosity liquid onto the mass transfer devices in the process vessel.

19. The method of claim 18 wherein the high viscosity liquid comprises a high viscosity liquid having a viscosity ranging from greater than about 500 cps at 25° C.

20. The method of claim 18 which includes placing structured packing material within the process vessel to promote the plug flow of the high viscosity liquid in the process vessel.

21. The method of claim 18 which includes introducing a gas in the lower portion of the process vessel and directing the gas to flow upwardly in a gas-liquid contact with the downwardly flowing, high viscosity liquid.

22. The method of claim 18 wherein the high viscosity liquid comprises a high viscosity, long chain, high molecular weight reactive liquid.

23. The method of claim 18 which includes flowing the vented high viscosity liquid first onto a conical exterior surface and thereafter onto the tubular exterior surface area.

24. The method of claim 18 which includes forming a liquid pool of the high viscosity liquid on the top surface of the mass transfer devices and flowing the vented low flow velocity liquid directly into the liquid pool.

25. The method of claim 18 which includes:
a) directing the high viscosity liquid downwardly from the liquid distributor in a plurality of feed pipes;
b) venting the high viscosity liquid at the other end of the feed pipe;
c) flowing the vented high viscosity liquid as a downwardly flowing film onto and over the exterior surface of a flow velocity tube positioned beneath the other end of the feed pipes; and
d) flowing the downwardly moving film of high viscosity liquid directly into the top surface of the mass transfer devices.

26. The method of claim 18 which includes applying a vacuum to the process vessel to aid in devolatilization of the high viscosity liquid.

27. The method of claim 18 which method includes: surrounding the tubular exterior surface with a splash guard means having an exterior surface at the upper end of the tubular surface to contain the high viscosity liquid within the splash guard means and to permit flow of excess high viscosity liquid over the exterior surface of the splash guard means.

28. The method of claim 18 which includes flowing the vented high viscosity liquid into a cup enclosure on the top of the tubular exterior surface area and permitting the overflow of high viscosity liquid from the cup enclosure to the tubular exterior surface area.

29. The method of claim 28 which includes draining a portion of the high viscosity liquid from the cup enclosure onto the tubular exterior surface area.

* * * * *